Figure 1:
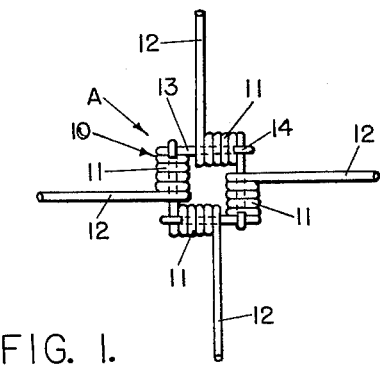

March 27, 1962   C. J. ZWICKEY   3,027,153
SPRING STRUCTURES
Original Filed Feb. 14, 1958

INVENTOR;
CLIFFORD J. ZWICKEY.

BY Robert M. Dunning
ATTORNEY

United States Patent Office 3,027,153
Patented Mar. 27, 1962

3,027,153
SPRING STRUCTURES
Clifford J. Zwickey, 107 12th Ave. NE.,
North St. Paul, Minn.
Original application Feb. 14, 1958, Ser. No. 715,304. Divided and this application Feb. 15, 1960, Ser. No. 8,754
7 Claims. (Cl. 267—1)

This invention relates to an improvement in spring structures and deals particularly with a spring unit which may be used for various purposes. This invention relates to an improvement in spring structures and deals particularly with a spring unit made up of a plurality of separate helical springs each of which is provided with an outwardly projecting arm. The other end of each spring element is provided with a second arm which serves as a connecting member for connecting the individual spring elements. For example, if two spring elements are employed, both of these elements include an arm connected to one end of the helical portion designed to have its free end serve any desired purpose and each element includes a second arm at the other end of the helical portion designed to extend into the helical portion of the other spring element to hold the spring elements assembled. If the spring unit is provided with three, four or more spring elements, each spring element includes a helical portion having an arm at each end thereof, the arms at one end of each element projecting away from the remainder of the spring unit, and the arm at the other end of the helical portion extending into the next adjacent spring element entering the end of the helical portion thereof from which the outwardly projecting end extends.

As a typical use for the spring unit, the spring structure may be mounted upon an arrow point or arrow head with the outwardly projecting arms extending outwardly from the axis of the arrow shaft to prevent the arrow from passing through leaves, grasss or underbrush and being lost in this foilage. The present application is a division of my previously filed application, Serial No. 715,304 filed February 14, 1958 for "Arrowhead."

A feature of the invention resides in the provision of a spring structure which is arranged in a ring shaped formation capable of encircling a suitable support. The spring structure comprises a plurality of springs, each of which is preferably identical. Each spring includes an intermediate helical coil portion and a spring arm extending substantially tangentially from one end of the coil portion and a second end arm extending generally tangentially from the opposite end of the spring coil. One arm of each such spring element extends through, or at least partially through, the coil of a similar adjacent spring element. The end of this arm is bent angularly to hold the springs assembled. As a result, the springs are connected to form a ring which may encircle a suitable support, and means are preferably provided to hold the spring unit from movement longitudinally of the support.

These and other objects and novel features of the present invention will be more clearly and fully set forth in the following specification and claims.

Figure 2:
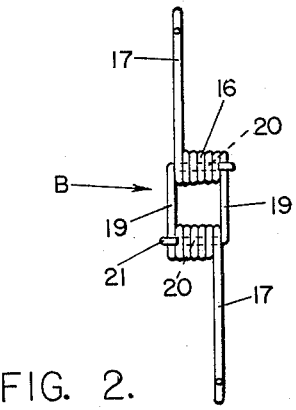
Figure 3:
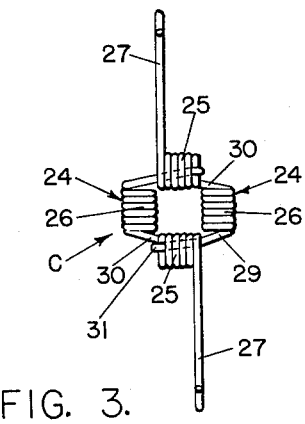

In the drawings forming a part of the specification:
FIGURE 1 is a plan view of the spring unit in assembled form.
FIGURE 2 is a plan view of a modified form of spring unit construction in which two spring elements are employed in place of the four elements illustrated in FIGURE 1.
FIGURE 3 is a plan view of another modified form of spring unit construction in which each spring element includes a pair of helical spring portions connected in angular relation.

Figure 4:
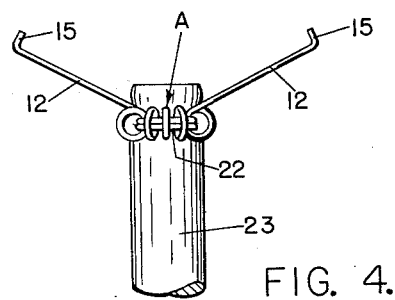

FIGURE 4 is an elevational view of a standard or support showing the spring unit mounted thereupon.

The spring unit A which is illustrated in FIGURE 1 of the drawings includes four similar spring elements 10 connected in ring shaped form. While the spring unit illustrated in FIGURE 1 discloses four spring elements, it will be understood that three somewhat similar elements could be employed or a number of spring elements greater than four could also be used by merely changing the angle of the arm of each element which connects the element to the adjoining element.

Each spring element 10 includes an intermediate helical coil 11 of spring wire or similar material, having a spring arm 12 projecting in a generally tangential direction from one end of the coil. A second spring arm 13 extends in a generally tangential direction from the other end of the helical coil. The arms 12 and 13 are integral with the coil and merely form extensions on the ends of the coil.

The spring units A are assembled by inserting the arm 13 of each spring element through the coil 11 of the next adjoining spring element, the arm 13 entering the coil 11 through the end of the spring from which the arm 12 extends. The end 14 of each arm 13 is bent angularly and is preferably bent into a hooked shape to hook over the end of a helical coil 11 from which the arm 13 projects.

It will be noted that when four spring elements connected together in series, with the arm 13 of each spring element extending through the helical coil of the next adjoining spring element, a resilient ring is provided in which the spring elements are securely attached together and in which the arms 12 project away from the remainder of the spring unit in any desired direction. If desired, the spring arms 12 may be bent to provide angularly turned ends 15 or may be shaped in any desired manner to accomplish a desired result.

When four spring elements are used to form the spring unit, the connecting arms may extend on a plane substantially normal to the axis of the helical portion of the spring. If the spring unit were made of three similar spring elements, the connecting arms would be bent to lie on a plane at an acute angle to a plane normal to the axis of the helical portion of the spring while if more than four spring elements were required, the connecting arms would be bent to lie on a plane diverging in the opposite direction.

In FIGURE 2 of the drawings I disclose a spring unit which is indicated in general by the letter B. This spring unit B includes a pair of similar spring elements each of which is provided with an intermediate helical coil portion 16 having a spring arm 17 projecting in a generally tangential direction from one end thereof and having a spring connecting arm 19 projecting in a generally tangential direction from the other end thereof. The connecting arm 19 extends on a plane substantially normal to the axis of the helical portion and includes an arm extension 20 which is bent at right angles to the portion 19 to extend generally parallel to the axis of the helical portion. The arm extension 20 of each spring element extends through the helical portion 16 of the opposite spring, entering the end of this helical portion from which the arm 17 projects. The extremity of the arm extension 20 is angularly bent as indicated at 21 to hook over the end of the helical spring portion from which the connecting arm 19 extends. Thus the helical portions of the two springs are arranged with substantially parallel axes and the connecting arms 19 also extend in a generally parallel relation.

It will be noted that the spring element of each of the spring units described may act as torsion springs due to the fact that one end of each helical spring portion is held from rotation while the outwardly projecting arm at the other end of each helical portion may flex about the axis of the helical portion.

As an example of this action, the spring unit A is illustrated in FIGURE 4 as being located in a groove 22 in a supporting shaft 23. The arms 12 at one end of the spring element are shown extending outwardly from the remainder of the spring units and are shown inclining outwardly and upwardly. If a weight is placed upon one or more of the arms 12 near the extremities 15 thereof, these arms may be flexed downwardly, swinging about the axes of the torsion spring portions to which they are attached. When this weight is removed, the spring arms will return to the normal position illustrated.

A third form of construction is indicated in general by the letter C in FIGURE 3 of the drawings. The spring unit C, similarly to the spring unit B includes but two similar spring elements which are indicated in general by the numeral 24. The spring units 24 include an intermediate helical coil portion which include a first helical section 25 and a second helical section 26 which are integrally connected together and which are bent or formed to provide the two sections with axes which intersect at substantially right angles. In other words, the helical portion may be formed by forming a spring with a single elongated helical portion and then bending the spring intermediate its ends so that the two helical sections are on the same plane but have axes which intersect at right angles. An arm 27 extends tangentially from the end of one section and a connecting arm 29 extends on a generally tangential plane from the opposite end of the second section 26. The ends of the spring sections 25 and 26 are connected as indicated at 30.

When the two spring elements 24 are formed, the connecting arms 29 extend generally parallel to the axis of the helical section 25 connected to the arm 27. Each arm 29 is extended through the helical section 25 of the other spring element and the extremity 31 of each connecting arm 29 is angularly bent to hook over an end of the coil section 25. The connecting arms 29 extend into the coils 25 from the end thereof supporting the arm 27 and hook over the opposite end of this coil section.

The spring unit C is thus quite similar to the spring unit B but differs in that it is considerably more flexible. In other words, it is possible for the sections 26 to expand in length thus permitting the assembled spring unit to be more readily mounted upon a support.

In accordance with the patent statutes, I have described the principles of construction and operation of my improvement in spring structures, and while I have endeavored to set forth the best embodiment thereof, I desire to have it understood that changes may be made within the scope of the following claims without departing from the spirit of my invention.

I claim:

1. A spring structure including a series of helical members, a series of projecting arms, a series of connecting arms, each of said connecting arms being integrally joined singly to one of the two ends of a helical member, each said projecting arm being connected to the other end of a helical member and arranged to swing most readily in a plane substantially normal to the axis of the coiled portion to which it is joined, said helical members comprising a plurality of angularly related helical portions, each said helical member being connected to another helical member of the series by means of a said connecting arm of one helical member extending within the helical coils of another helical portion and being secured therein.

2. The structure of claim 1 and having each said helical member connected to another helical member of the series by means of a connecting arm of one helical member extending within and emerging from the helical coils of said other helical portion, the emerging portion of said connecting arm being turned at a substantial angle to the portion of said arm within the helical coils and extended beyond the periphery of said helical member.

3. A spring structure including a series of helical portions, a series of projecting arms, and a series of connecting arms, each of said connecting arms being integrally joined singly to one of the two ends of one of the said helical portions, each of the said projecting arms being connected to the other end of a helical portion and arranged to swing most readily in a plane substantially normal to the axis of the helical portion to which it is joined, each helical portion being connected to the next succesive helical portion of the series by means of the connecting arm of one helical portion extending within the helical coils of the said next successive helical portion of the series and being secured therein.

4. A spring structure including a series of spring units interconnected in a circuitous sequence, each of said units including, a helical portion, a projecting arm integrally joined to one end of said helical portion and arranged to swing most readily in a plane substantially normal to the axis of said helical portion, and a connecting arm integrally jointed to the other end of said helical portion, said connecting arm extending axially within the helical portion of the next successive spring unit of the series and emerging therefrom, the emerging portion of said connecting arm being bent over the end of the helical portion and extended beyond the periphery of said helical portion, the axes of all of said helical portions lying substantially on a common plane.

5. The structure of claim 4 and in which said projecting arm projects from said helical portion in a direction generally outwardly from the axis of said spring structure.

6. A spring structure including a series of spring units interconnected in a circuitous sequence, each of said units including, a helical portion, a projecting arm integrally joined to one end of said helical portion and arranged to swing most readily in a plane substantially normal to the axis of said helical portion, and a connecting arm integrally joined to the other end of said helical portion, said connecting arm extending through the helical coils of the helical portion of the next successive spring unit of the series, an anchoring member attached to said connecting arm and extending laterally beyond the inner diameter of the helical coils of the helical portion at the connecting arm end of the said next successive spring unit of the series.

7. A spring structure including a series of helical portions connected in an unterminated circuitous sequence, alternate helical portions being connected to an adjacent end of the remaining helical portions, projecting arms on the other ends of said alternate helical portions arranged to swing most readily in a plane normal to the helical portion to which it is joined, connecting arms on the other ends of said remaining helical portions, said connecting arms extending through the next adjacent said alternate helical portion and being secured therein.

References Cited in the file of this patent

UNITED STATES PATENTS

| 425,984 | Colby | Apr. 22, 1890 |
| 2,867,842 | Morton | Jan. 13, 1959 |

FOREIGN PATENTS

| 135,218 | Germany | Nov. 6, 1902 |
| 264,757 | Great Britain | Jan. 27, 1927 |